United States Patent
Reynolds, Jr. et al.

(10) Patent No.: US 6,620,475 B1
(45) Date of Patent: Sep. 16, 2003

(54) STRUCTURE FOR WOUND FIBER REINFORCED PLASTIC TUBING AND METHOD FOR MAKING

(75) Inventors: Harris A. Reynolds, Jr., Houston, TX (US); Joel D. Shaw, Houston, TX (US); Thomas J. Walsh, Houston, TX (US); Chris A. Lundberg, Kingwood, TX (US)

(73) Assignee: Hydril Company, Houston, TX (US)

( * ) Notice: Subject to any disclaimer, the term of this patent is extended or adjusted under 35 U.S.C. 154(b) by 46 days.

(21) Appl. No.: 09/636,816

(22) Filed: Aug. 10, 2000

(51) Int. Cl.$^7$ ............................................... B29D 22/00
(52) U.S. Cl. ..................... 428/36.3; 428/36.6; 428/373; 428/377; 428/383; 428/396; 138/125
(58) Field of Search ........................ 138/125; 428/36.6, 428/373, 34.7, 377, 383, 396

(56) References Cited

U.S. PATENT DOCUMENTS

| | | | |
|---|---|---|---|
| 3,661,670 A | 5/1972 | Pierpont, Jr. ................ 156/172 |
| 3,679,237 A | 7/1972 | De Angelis ................. 285/109 |
| 3,769,127 A | 10/1973 | Goldworthy et al. ....... 156/172 |
| 4,118,262 A | 10/1978 | Abbott ........................ 156/175 |
| 4,185,472 A | 1/1980 | Yates et al. .................... 64/1 S |
| 4,187,135 A | 2/1980 | Yates et al. ................. 156/187 |
| 4,248,062 A | 2/1981 | McLain et al. ............... 64/1 S |
| 4,279,275 A | 7/1981 | Stanwood et al. .......... 138/109 |
| 4,310,183 A | 1/1982 | Szalvay ....................... 285/114 |
| 4,380,443 A | 4/1983 | Federmann et al. ........ 464/181 |
| 4,385,644 A | 5/1983 | Kaempen .................... 138/109 |
| 4,530,379 A | 7/1985 | Policelli ...................... 138/109 |
| 4,558,971 A | 12/1985 | David .......................... 405/158 |
| 4,647,078 A | 3/1987 | Lundy ......................... 285/149 |
| 4,701,231 A | 10/1987 | Peters et al. ................. 156/172 |
| 4,770,926 A * | 9/1988 | Yamamura et al. .......... 428/224 |
| 4,810,010 A | 3/1989 | Jones ............................ 285/55 |
| 4,813,715 A | 3/1989 | Policelli ...................... 285/149 |
| 4,830,409 A | 5/1989 | Freeman ..................... 285/104 |
| 4,834,932 A | 5/1989 | Salzman et al. ............ 264/255 |
| 4,865,356 A | 9/1989 | Moore et al. .................. 285/55 |
| 4,875,717 A | 10/1989 | Policelli ...................... 285/149 |
| 5,082,314 A | 1/1992 | Aubrey et al. ............... 285/174 |
| 5,248,169 A | 9/1993 | Barbe et al. ................. 285/110 |
| 5,330,236 A | 7/1994 | Peterjohn et al. ........... 285/149 |
| 5,332,049 A | 7/1994 | Tew ............................. 175/320 |
| 5,378,023 A | 1/1995 | Olbrich ........................ 285/24 |
| 5,437,899 A * | 8/1995 | Quigley ...................... 428/35.7 |
| 5,520,422 A | 5/1996 | Friedrich et al. ............ 285/318 |
| 5,636,878 A | 6/1997 | Millward et al. ............. 285/55 |
| 5,685,576 A | 11/1997 | Wolfe et al. ................. 285/149 |
| 5,828,003 A | 10/1998 | Thomeer et al. .............. 174/69 |
| 5,913,337 A | 6/1999 | Williams et al. ............ 138/125 |
| 5,921,285 A | 7/1999 | Quigley et al. ............. 138/125 |
| 5,933,945 A | 8/1999 | Thomeer et al. .............. 29/825 |

OTHER PUBLICATIONS

Chapter 7 "Filament Winding Composite Structure Fabrication" Dec. 17, 1995 (publication unknown).

\* cited by examiner

*Primary Examiner*—C. Melissa Koslow
*Assistant Examiner*—Shalie Manlove
(74) *Attorney, Agent, or Firm*—Rosenthal & Osha L.L.P.

(57) ABSTRACT

A fiber reinforced plastic article is disclosed which include a liner, at least one single material fiber layer wound on the liner, and at least one composite fiber layer wound on the single material fiber layer. The at least one single material fiber layer and the at least one hybrid fiber layer are impregnated with resin.

7 Claims, 2 Drawing Sheets

STRUCTURE FOR WOUND FIBER REINFORCED PLASTIC TUBING AND METHOD FOR MAKING

BACKGROUND OF THE INVENTION

1. Field of the Invention

The invention is related generally to the field of wound fiber reinforced plastic articles. More specifically, the invention is related to particular structures for such articles which have increased pressure carrying capacity.

2. Description of the Related Art

Wound fiber reinforced plastic tubing is known in the art, particularly for use as a substitute to steel tubing in certain applications. Typically, wound fiber reinforced plastic tubing includes an inner impermeable liner, which can be made from thermoplastic or the like, and has various types of fiber wound on the exterior of the liner in a selected pattern. The fiber can be glass, carbon, aramid or other type of fiber, or combinations of fiber types, depending on the mechanical requirements for the finished tubing. The fiber can be impregnated with resin prior to, during, or after winding. The resin is typically a thermoset resin, and can be cured by various types of heating systems.

A very useful type of wound fiber reinforced plastic tubing includes a combination, typically half by volume each of carbon fiber and glass fiber forming each layer of fiber wound on the liner. The carbon and glass fibers are wound in a substantially helical pattern, in a plurality of layers, over the exterior of the liner. The carbon and glass fiber are disposed in alternating spools on a winding machine during the wrapping process. The resulting layer of fibers wound on the liner is known as a "intralaminar hybrid" layer because it is made up of more than one type of fiber within the layer. The reason that the intralaminar type of layer has proven useful is that it provides the finished tubing with substantial flexibility related to the lower stiffness, more flexible glass fibers, while substantially improving the pressure carrying capacity of the finished tubing over that of tubing wound only using glass fiber to reinforce the liner. As is known in the art, flexibility in the finished tubing is important because the finished tubing is typically wound on large reels or spools for transport and use in the intended application for the tubing.

A limitation of the intralaminar hybrid composite tubing known in the art is susceptibility to failure at internal fluid pressures lower than would be expected given the composite mechanical properties of the fiber layers wound around the liner. The carbon fiber in the typical intralaminar hybrid layer tubing provides a calculable increase in the expected pressure carrying capacity of the finished tubing, but practical fiber reinforced tubing made using intraminar layers method have generally not provided a pressure carrying capacity commensurate with the increased strength of the carbon fiber.

It is desirable to have a wound fiber reinforced plastic tubing which has a pressure carrying capacity more closely related to that expected by providing composite fiber layers on the tubing.

SUMMARY OF THE INVENTION

One aspect of the invention is a fiber reinforced plastic article which include a liner, at least one single material fiber layer wound on the liner, and at least one hybrid fiber layer wound on the single material fiber layer. The at least one single material fiber layer and the at least one hybrid fiber layer are impregnated with resin.

In one embodiment, the single material fiber layer includes glass fiber. In one embodiment, the hybrid fiber layer includes a combination of glass and carbon fiber. In a particular embodiment, the glass and carbon each make up about 50 percent by volume of the composite fiber layer.

Another aspect of the invention is a method for making a wound fiber reinforced plastic tubing. The method includes winding at least one single material fiber layer over a liner; and winding at least one hybrid fiber layer over the at least one single material fiber layer. The at least one single material fiber layer and the at least one hybrid fiber layer are impregnated with resin.

In one embodiment, the method further includes winding a plurality of hybrid fiber layers on top of the at least one single material fiber layer. In this embodiment, each of the plurality of hybrid fiber layers is wound in an opposed lay direction to the previous composite layer.

DETAILED DESCRIPTION OF THE INVENTION

Figure 1:
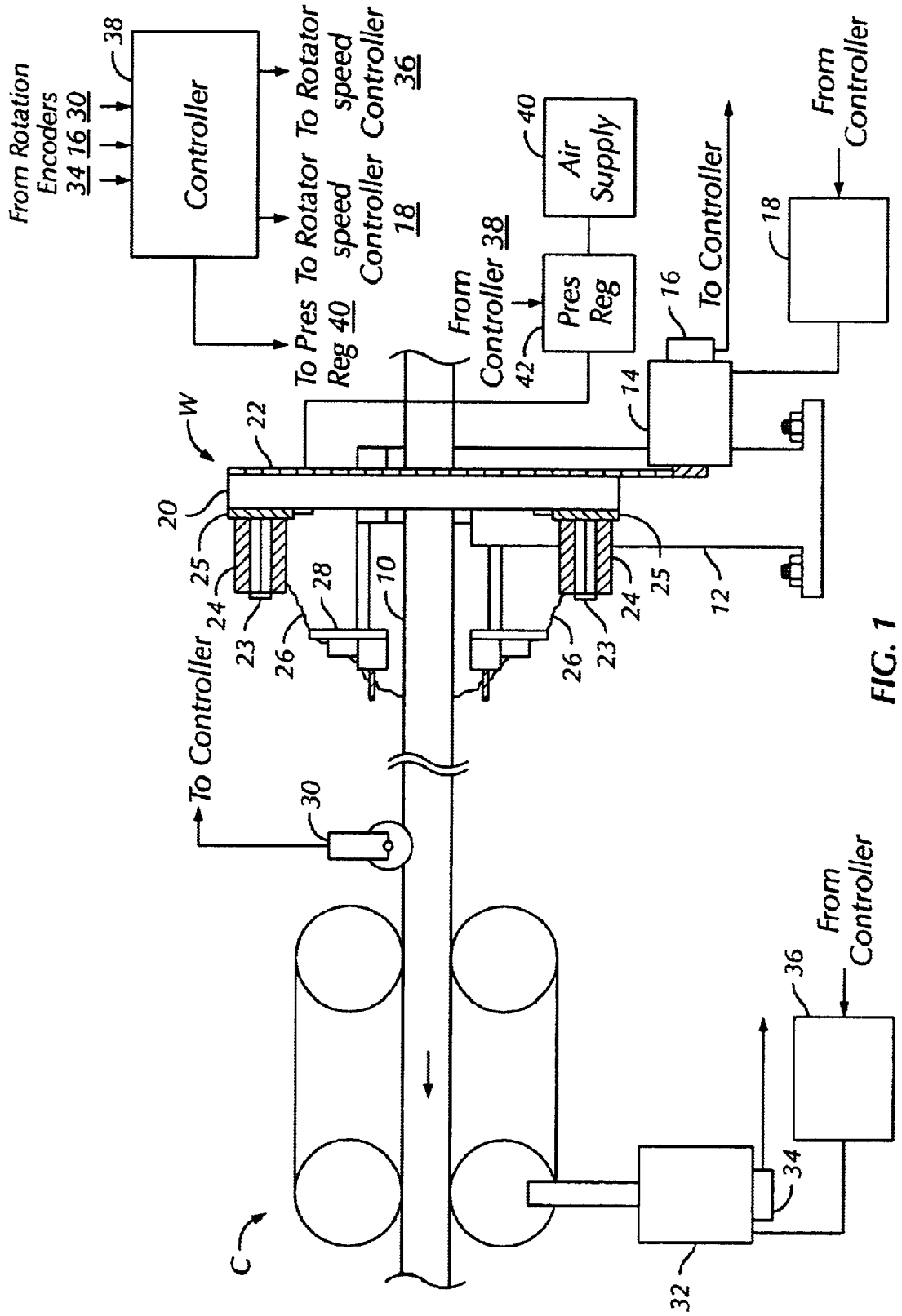
FIG. 1 shows an example of a winding system according to the invention.

FIG. 1 shows, in general form, one example of the fiber winding system for making wound-fiber reinforced plastic articles. The system includes two or more winding stations W (only one of which is shown in FIG. 1 for clarity), and a conveyor C to draw an article 10 through the system substantially axially therethrough. In this example the article 10 on which the fiber is to be wound is plastic pipe, such as thermoplastic tubing used as the liner in a continuously-made fiber reinforced plastic tubing as would be used in petroleum wellbores.

The conveyor C in this example is a belt-type conveyor which pulls the liner 10 axially therealong by frictional force. Any other suitable type of conveyor can also be used to draw the liner 10 axially through the system. FIG. 1 shows only one winding station W for clarity of the illustration, but it is to be clearly understood that the system can include any number of such winding stations. In making a fiber reinforced plastic tube according to the invention, there will typically be at least two winding stations W, as will be further explained. The total number of winding stations will depend on, among other things, the type of article being reinforced by the fibers wound thereon, or on the desired characteristics of the finished wound-fiber reinforced article, as is known in the art.

As the liner 10 is drawn through the winding station W, in this example the winding station W rotates about the liner 10 so that fibers 26 are wound onto the liner 10 in a substantially helical pattern about the exterior surface of the liner 10. The fibers 26 can be made from glass, graphite or other fiber composition used to make fiber reinforced products, and are typically provided on spools or bobbins 24. The bobbins 24 are mounted on spindles 23 positioned at circumferentially spaced apart locations about a winder drum 20. The number of and positions of the spindles 23 (and bobbins 24 thereon) on the winder drum 20 are not critical to the invention, but as is known in the art, depend on factors including the numbers of fibers intended to be wound on the liner 10, and any applicable size limitations on the drum 20. Such size limitations may be related to the available space in a building (not shown) in which the system is located, for example.

In this embodiment, the bobbins 24 have all glass fiber on a first one of the winding stations W. Other types of fiber may be used on the first winding station W as long as substantially all the fibers are of the same material, as will be further explained. A second winding station W (not shown in FIG. 1) includes thereon alternating types of fiber on the bobbins 24, such as glass and carbon, for example. The alternating type of fiber produces a "intralaminar hybrid" layer when wound on the liner 10. Intralaminar hybrid layers provide relatively high flexibility to the finished fiber reinforced article, while having a pressure carrying capacity which is substantially greater than that of a similar fiber reinforced article having only the lower strength fiber as the reinforcing element.

The winder drum 20 in this example is rotatably mounted on a frame 12, which is preferably affixed to the floor surface in the building or facility in which the system is located. The winder drum 20 in this example is rotated by a first electric motor 14, the output of which is coupled to the winder drum 20 by a chain 22. The type of rotational coupling used between the first motor 14 and the winder drum 20 is not critical to the invention, but preferably the coupling provides very little rotational backlash, so that the rotational motion of the winder drum 20 very precisely corresponds to the rotational motion of the first motor 14. The first motor 14 includes a first encoder 16 mounted thereon. The first encoder 16 generates a signal corresponding to rotational motion of its rotational input. Photoelectric encoders, Hall-effect transducers or any other similar type transducer can be used in the first encoder 16. The rotational input of the first encoder 16 is rotationally coupled to the first motor 14. The first encoder 16 generates a signal, therefore, which corresponds to the rotational position of the first motor 14, or to the rotational speed of the first motor 14. Alternatively, the first encoder 16 can be rotationally coupled to the drum 20. In the example shown in FIG. 1, the encoder 16 is rotationally coupled to the first motor 14 as a matter of convenience in mounting. Also, due to the reduction gearing between the first motor 14 and drum 20 as provided by the chain 22, such rotational coupling of the first encoder 16 provides greater accuracy in measurement of the rotational speed or position of the winder drum 20.

The signal output of the first encoder 16 is conducted to a system controller 38. The system controller 38 calculates and sends a signal, in response to the input signal from the first encoder 16, to a first motor speed controller 18. The first motor speed controller 18 is operatively coupled to the first motor 14 to control the speed of the first motor 14, as will be further explained. The system controller 38 can be a microcomputer, microprocessor or any other suitable signal processing device which can generate preselected output signals in response to sensor input signals, such as those from the first encoder 16. The manner in which the system controller 38 uses the signals from the first encoder 16 will be further explained.

The fibers 26 in this example prior to winding onto the article 10 pass through an impregnator or "resin ring" 28 coupled to the winder drum 20. The resin ring 28 will be further explained. After passing through the resin ring 28, the fibers 26 are wound around the liner 10 by the rotation of the winder drum 20 with respect to the liner 10. It should be clearly understood that in this aspect of the invention, the fibers 26 can be directly wound onto the liner 10 without passing through the resin ring 28 as shown in FIG. 1. In this case the resin would be applied to the fiber-wound liner 10 later in the manufacturing process, or a form of pre-impregnated fiber called "pre-preg" may also be used where the resin ring 28 is omitted from the system. The resin used to make a tube in this example can be thermoset resin. The type of resin used will depend on the environment in which the finished tube is to be used, as is known in the art. Other types of resin which may also be used in any embodiment of the invention include, for example, thermoplastic resin, ceramic resin and metallic resin. Some types of resin may be "heat consolidated" to cure in order to form the finished tube.

The linear or axial speed at which the liner 10 passes through the winding station W in this example can be measured by a second encoder 30, which can include (the second encoder 30 elements not shown separately) a wheel in frictional contact with the liner 10. Rotation of the wheel will correspond directly to the axial motion of the liner 10. The wheel is rotationally coupled to a photoelectric sensor, Hall-effect transducer, or any other type of rotary motion encoder which generates a signal corresponding to the rotation of the wheel. The signal from the second encoder 30 is coupled to the system controller 38.

The second encoder 30 is preferably disposed proximate to the discharge side of the winding station W. The second encoder 30 can be located at any other convenient location along the system where the axial motion of the liner 10 can be measured, but it should be noted that when the second encoder 30 is located farther away from the winding station W, the accuracy with which the second encoder 30 signal corresponds to the axial speed of the liner 10 through the winding station W will be commensurately reduced.

The conveyor C can be driven by a second electric motor 32, which in this example includes a third encoder 34 attached thereto, and a second motor speed controller 36 operatively coupled to the second motor 32. The second motor speed controller 36 obtains a control signal from the system controller 38. In operation of the system, the measurement of the axial speed made by the second encoder 30 can be used to cause the system controller 38 to generate a signal conducted to the second motor speed controller 36, whereby the speed of the second motor 32 can be adjusted to maintain a substantially constant, selected rate of axial motion of the article 10 through the system.

In operation, the system will wind the fibers 26 so that the fibers 26 traverse a substantially helical pattern about the exterior of the liner 10, because the drum 20 rotates about the liner 10 as the liner 10 is moved axially through the winding station W by the conveyor C. The lay angle of the fibers 26 as they are so wound will depend on the rotation rate of the winder drum 20 about the liner 10 as well as the rate of axial movement of the liner 10 through the system. The rotation rate of the winder drum 20 is selected to maintain a very precise and substantially constant lay angle of the fibers 26 on the exterior of the liner 10. This is performed by adjusting the rotation rate of the winder drum 20 to correspond precisely to the measured rate of axial motion of the article.10 through the system. The signal from the first encoder 16 is processed in the controller 38 along with the signal from the second encoder 30 to generate a signal for the first motor speed controller 18 which results in the appropriate rotation rate for the winder drum 20. Alternatively, the axial speed of the liner 10, which is controlled by the conveyor C speed, can be adjusted to precisely correspond to a selected, constant rotational speed of the winding station W.

An advantageous aspect of using the second encoder 30 to measure the axial motion of the liner 10 is particularly suited to where the liner 10 comprises fiber reinforced tubing made in continuous form for use in petroleum wellbores. Making such continuous tubing typically requires that the conveyor C be located a substantial axial distance from the winding station W, as the typical tubing making process will include a resin curing device (not shown in FIG. 1) interposed between the winding station W and the conveyor C. The tubing is subject to some axial elongation as a result of being drawn through the system by the conveyor C, and may also become somewhat more elastic as a result of being heated in the curing device (not shown). As a result, the axial speed of the liner 10 at the winding station W may not precisely correspond to the axial speed of the liner 10 at the conveyor C. By measuring the axial speed of the article 10 near the winding station W and adjusting the rotational speed of the winding station W in response to the measurement of axial speed of the liner 10, it has been determined that the lay angle of the fibers can be maintained to within a tolerance of about one-half degree, which is preferred for both a composite layer and a single fiber type layer.

Particularly for such applications as petroleum wellbore tubing, it has been determined that maintaining selected tension on the fibers 26 during winding thereof can improve the performance of the finished wound-fiber reinforced tubing. In this example, each of the spindles 23 includes a brake 25 which retards rotation of the bobbin 24 mounted on the particular spindle 23. In this example, the brake is an air brake coupled to an air supply 40 through a pressure regulator 42. The pressure regulator 42 provides selected operating pressure to the brake 25. The operating pressure magnitude is related to a control signal provided by the system controller 38. Other types of brake, such as electromagnetic brakes or hydraulic brakes can be used in this aspect of the invention. The force applied by the brakes 25 in response to the control signal from the system controller 38 will cause the bobbin 24 to resist rotation, as the fibers 26 are pulled off the bobbin 24, to the extent of the braking force exerted by the brake 25. This results in tension being applied to the fibers 26 which is related to the amount of braking force. The amount of tension can be controlled by measuring the tension on the fibers 26, such as by a probe which measures deflection of the fibers 26 on application of a known force applied thereto, or by other convenient measurement which corresponds to the tension on the fibers 26. One such corresponding measurement is the torque exerted by the first motor 14. The torque can be measured by a torque sensor (not shown) rotationally coupled to the first motor 14, or alternatively can be calculated in the system controller 38 from measurement of the current drawn by the first motor 14. During operation of the system, the brake 25 force is adjusted, by the output signal from the system controller 38, so that the tension on the fibers 26 is maintained at a preselected value. The preselected value can be maintained irrespective of the rotational speed of the winder drum 20 by controlling the braking force on the spindles 23. It is clearly within the contemplation of this invention that the tension on the fibers 26 can be varied during fiber winding on any particular article 10 to suit the needs of the particular article. Prior art winding systems included a fixed friction brake on the spindles. Among other limitations of fixed-friction brakes, the tension on the fibers changes as the fibers are drawn off the bobbins and the diameter of the bobbins changes. Tension on the fibers 26 will also change with respect to the winding speed (or drum rotation speed) using fixed-friction spindle brakes as in the prior art.

Although various features are shown in a winding system used to make fiber reinforced tubing according to the invention, it should be understood that the invention does not depend on using any particular type of winding system. For example, a winding system shown in U.S. Pat. No. 3,769,127 issued to Goldsworthy et al would also be able to make fiber reinforced tubing according to the invention.

Having explained, generally, winding fibers over an article to be reinforced (the liner 10 in this embodiment), the structure and composition of the fiber layers according to the invention will now be explained. As described earlier, a first winding station has thereon fibers which are substantially all the same material. In one example, the fibers can be glass fiber. Other fibers such as aramid, carbon, or one sold under the trade name KEVLAR by E. I. duPont de Nemours & Co., Wilmington, Del. can be used as alternatives to glass. The result is to wind a fiber layer consisting of only one material onto the exterior surface of the liner 10. More than one such single-fiber layer may be wound directly onto the exterior surface of the liner 10, as long as at least one such layer is wound thereon.

Figure 2:
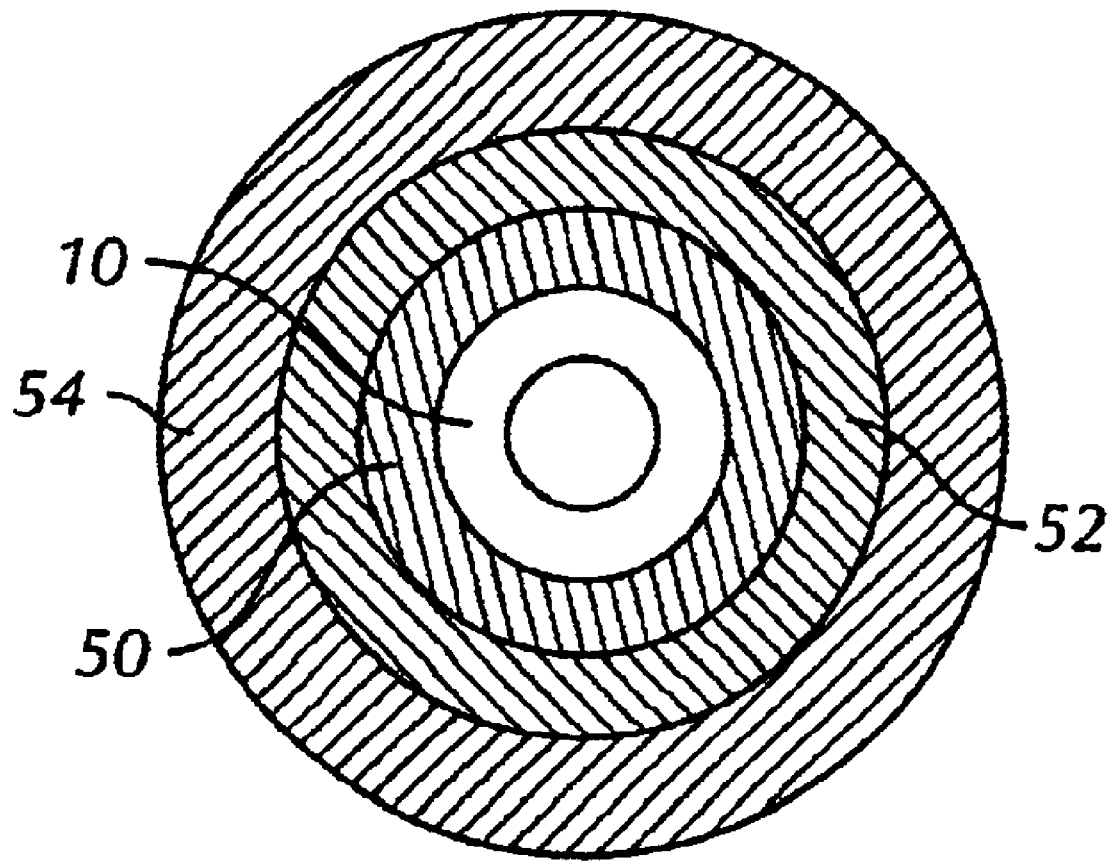
FIG. 2 shows a cross section of one embodiment of a fiber reinforced plastic tube made according to the invention.

At the second winding station (not shown in FIG. 1), or at any successive winding station, depending on the number of single-fiber layers desired to by applied to the liner 10, the bobbins 24 may include alternating types of fiber, such as glass/carbon, glass/aramid or any other combination of fiber types which provides a composite fiber layer having desired mechanical properties. These properties include relatively high flexibility in the finished tubing, while having fluid pressure carrying capacity which is substantially greater than that of a tube having only the more flexible fiber (such as glass) wound thereon. Typically the finished tubing will include a plurality of such composite fiber layers. A typical structure for a tube made according to the invention is shown in cross-section in FIG. 2. The liner 10 has wound thereon at least one layer 50 of single-fiber. Wrapped around the single fiber layer 50 is a first composite fiber layer 52. In this embodiment, the first composite fiber layer 52 has wound thereon a second composite fiber layer 54. Typically, the fiber layers 50, 52, 54 will be wound in opposed-hand helical lay directions. As is known in the art, opposed hand lay directions can be made by having successive winding stations (W in FIG. 1) rotate in opposite directions, among other methods. One example of a composite fiber layer includes glass and carbon fiber each making up about 50 percent by weight of the composite layer.

It has been determined that the pressure carrying capacity of a wound fiber reinforced tube made according to the invention has substantially improved fluid pressure carrying capacity as compared to such reinforced tubes made only with composite fiber layers.

The invention has been described with respect to certain embodiments. Those skilled in the art will devise other embodiments of the invention which do not depart from the spirit of the invention as disclosed herein. Accordingly, the invention shall be limited in scope only by the attached claims.

What is claimed is:

1. A fiber reinforced plastic article comprising:
   a liner;
   at least one single material fiber layer wound on the liner; and
   a plurality of hybrid fiber layers wound successively on top of the at least one single fiber layer, each hybrid fiber layer wound in an opposed lay direction to the previously wound hybrid fiber layer, the at least one single fiber layer and at least one of the plurality of the hybrid fiber layers impregnated with resin.

2. The article as defined in claim 1 wherein the liner comprises thermoplastic tubing.

3. The article as defined in claim 1 wherein the at least one single material fiber layer comprises glass fiber.

4. The article as defined in claim 1 wherein the at least one single material fiber layer comprises one selected from the group of glass, carbon and aramid.

5. The article as defined in claim 1 wherein the at least one hybrid fiber layer comprises glass fiber and carbon fiber, each of the glass and carbon making up about 50 percent by volume of the hybrid fiber layer.

6. The article as defined in claim 1 wherein the resin comprises thermoset resin.

7. The article as defined in claim 1 wherein the resin comprises thermoplastic resin.

* * * * *